(12) United States Patent
Chang et al.

(10) Patent No.: US 10,567,314 B1
(45) Date of Patent: Feb. 18, 2020

(54) PROGRAMMABLE INTELLIGENT AGENTS FOR HUMAN-CHATBOT COMMUNICATION

(71) Applicant: D8AI Inc., Taipei (TW)

(72) Inventors: Fu-Chieh Chang, Taipei (TW); Yuh-Bin Tsai, Taichung (TW); Jeng-Chuan Chang, Taipei (TW); You-Zheng Yin, Taipei (TW); Pei-Hua Chen, Taipei (TW); Richard Li-Cheng Sheng, Davis, CA (US); Hui Hsiung, Pasadena, CA (US)

(73) Assignee: D8AI Inc., Taipei (TW)

( * ) Notice: Subject to any disclaimer, the term of this patent is extended or adjusted under 35 U.S.C. 154(b) by 0 days.

(21) Appl. No.: 16/207,195

(22) Filed: Dec. 3, 2018

(51) Int. Cl.
| | |
|---|---|
| *H04L 12/58* | (2006.01) |
| *H04N 7/15* | (2006.01) |
| *H04M 3/51* | (2006.01) |
| *H04M 3/42* | (2006.01) |
| *H04M 7/00* | (2006.01) |
| *H04M 11/00* | (2006.01) |
| *G08C 23/04* | (2006.01) |

(52) U.S. Cl.
CPC ............ *H04L 51/02* (2013.01); *G08C 23/04* (2013.01); *H04M 3/42323* (2013.01); *H04M 3/5191* (2013.01); *H04M 7/0012* (2013.01); *H04M 11/007* (2013.01); *H04N 7/155* (2013.01); *H04N 7/157* (2013.01)

(58) Field of Classification Search
USPC ........................................ 348/14.01; 455/116
See application file for complete search history.

(56) References Cited

U.S. PATENT DOCUMENTS

| | | | |
|---|---|---|---|
| 2018/0173999 A1* | 6/2018 | Renard | ................. G06F 17/279 |
| 2019/0066674 A1* | 2/2019 | Jaygarl | ............... G06F 3/04886 |

* cited by examiner

*Primary Examiner* — Maria El-Zoobi
(74) *Attorney, Agent, or Firm* — Winston Hsu

(57) ABSTRACT

This invention provides programmable intelligent agents that facilitate and manage voice or video conversations between human users and chatbots over the Internet or the Public Switched Telephone Network. Functions of said intelligent agents include providing the communication connectivity, coordinating the human-chatbot conversation, reacting and responding to the human user's conversational behavior, and in certain applications, sending controlling signals to peripheral devices according to intents of the conversation, or receiving data from peripheral sensors as references to alter the course of the conversation. Furthermore, a said intelligent agent can serve as a user interface that enables human users in the vicinity of the intelligent agent to engage in an interactive three-way conversation with a chatbot and remote human users.

18 Claims, 6 Drawing Sheets

US 10,567,314 B1

PROGRAMMABLE INTELLIGENT AGENTS FOR HUMAN-CHATBOT COMMUNICATION

BACKGROUND OF THE INVENTION

1. Field of the Invention

The subject matter disclosed herein relates to the Internet and telephony communications incorporating artificial intelligence. Particularly, the present invention provides programmable intelligent agents that facilitate and manage voice or video conversations between human users and chatbots over the Internet or the Public Switched Telephone Network.

2. Description of the Prior Art

A chatbot is a computer program employing artificial intelligence that simulates interactive human conversation with human users. With the advancements of artificial intelligence technology, chatbots have seen wide-spreading uses in areas such as information inquiry, customer services, telemarketing, and virtual assistants. It is common that conversations between humans and chatbots are done remotely—over the Internet or the Public Switched Telephone Network (PSTN).

FIG. 1 illustrates how a human-chatbot conversation over the Internet or the PSTN is commonly implemented. For a human user using a computer or a smartphone—via a website or a mobile app, to engage in a voice or video call with a remote chatbot over the Internet, the chatbot is commonly linked with the Internet through a web-call server. On the other hand, if the human-chatbot conversation is transmitted over the PSTN with a telephone call—via either a telephone line or a cellular system, usually a private-branch-exchange (PBX) system equipped with automatic-call-distribution (ACD) and computer-telephony-integration (CTI) functionalities is used to route the voice call between the chatbot and the PSTN.

The chatbot can be situated in the same local network with the web-call server or the ACD/CTI server, or it can be located elsewhere in the Internet cloud. In many applications, a single chatbot is used to serve a large number of human users, and hence the computing loading of the chatbot server (computer hardware that contains the chatbot software) may become an issue when the human-chatbot interaction involves a higher degree of complexity.

SUMMARY OF THE INVENTION

The present invention provides programmable intelligent agents that facilitate and manage voice or video conversations between human users and chatbots over the Internet or the Public Switched Telephone Network. A said intelligent agent bridges the chatbot both to the Internet cloud and to the PSTN system, as well as adds interactive capability and flexibility to the chatbot.

Functions of said intelligent agents include providing the communication connectivity, coordinating the human-chatbot conversation, reacting and responding to the human user's conversational behavior, and in certain applications, sending controlling signals to peripheral devices according to intents of the conversation, or receiving data from peripheral sensors as references to alter the course of the conversation. Furthermore, a said intelligent agent can serve as a user interface that enables human users in the vicinity of the intelligent agent to engage in an interactive three-way conversation with a chatbot and remote human users.

Benefits of said intelligent agents include providing significantly more capability and flexibility—hence enabling a high degree of complexity, for the human-chatbot communication without overloading the chatbot server.

These and other objectives of the present invention will no doubt become obvious to those of ordinary skill in the art after reading the following detailed description of the preferred embodiment that is illustrated in the various figures and drawings.

DETAILED DESCRIPTION

The scope of the present invention is defined by the claims appended to the following detailed description, while the embodiments described herein serve as illustrations, not limitations, of the claims.

Figure 1:
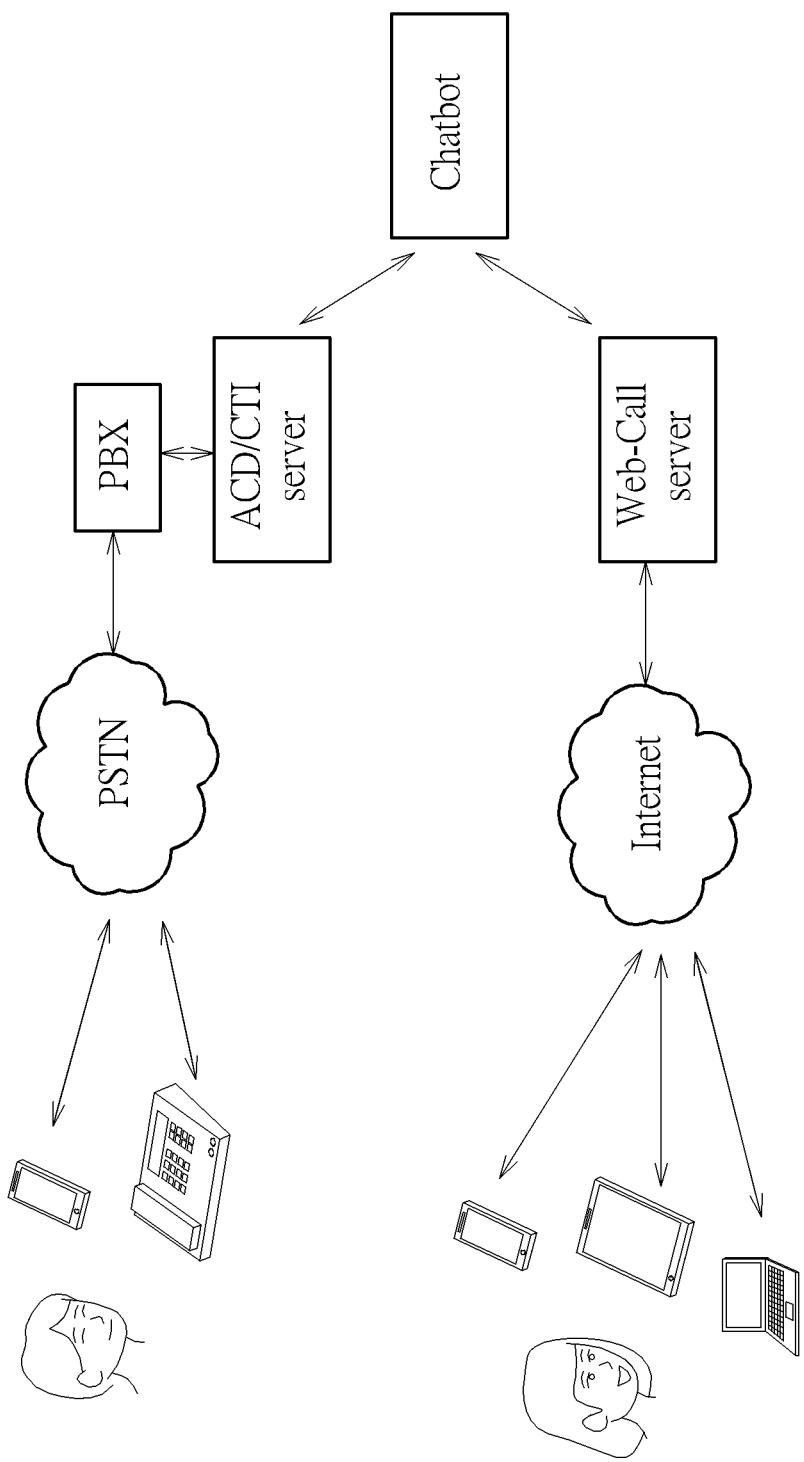
FIG. 1 is a block diagram illustrating the routing of human-chatbot conversations over the Internet or the Public Switched Telephone Network (PSTN) in the prior art.
Figure 2:
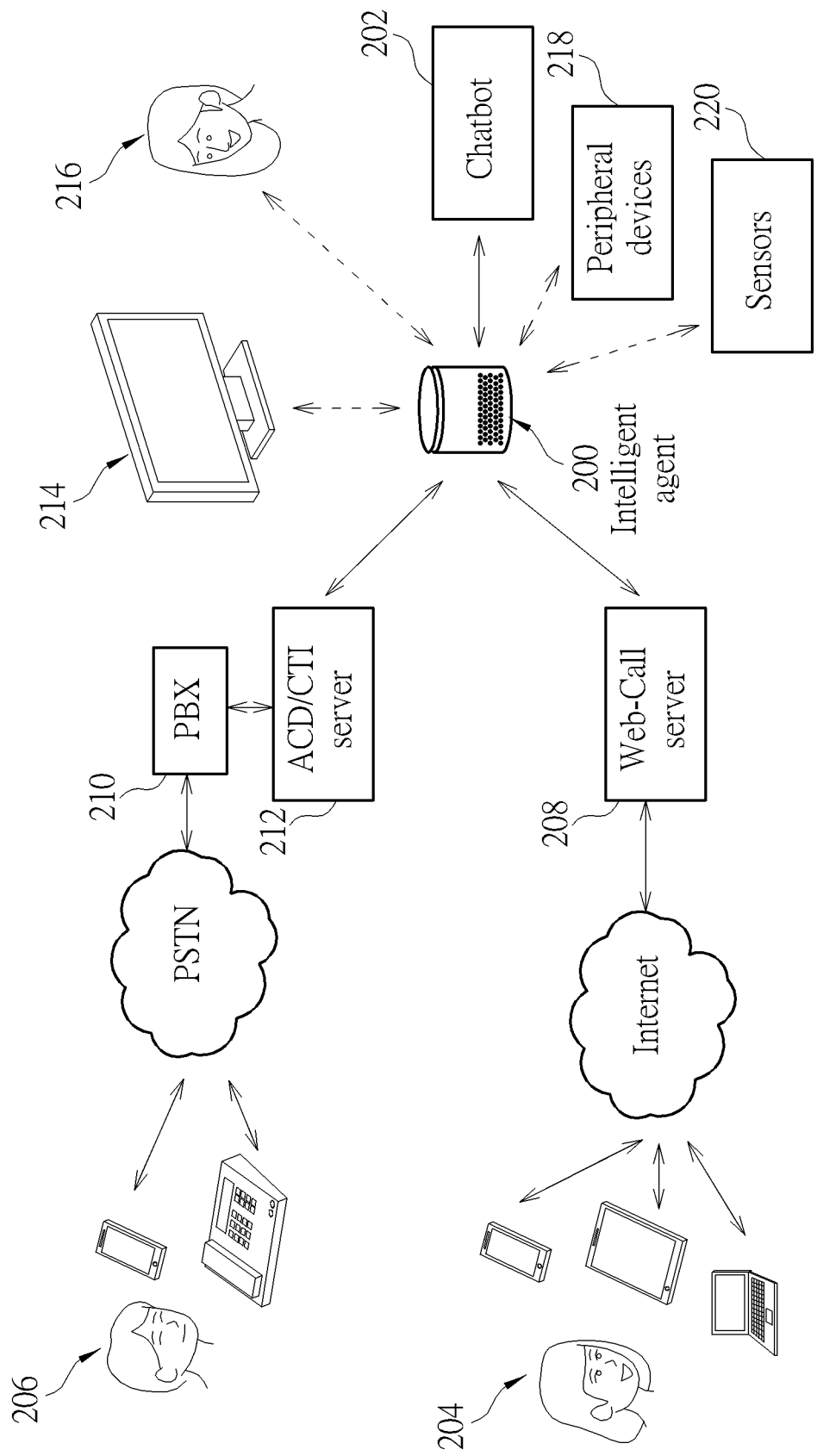
FIG. 2 is a block diagram illustrating the routing of human-chatbot conversations over the Internet or the Public Switched Telephone Network (PSTN) consistent with some embodiments of the present invention.

FIG. 2 is a block diagram illustrating the routing of human-chatbot conversations over the Internet or the Public Switched Telephone Network (PSTN) that employs an intelligent agent of the present invention. The intelligent agent 200 is linked to a chatbot 202 either wirelessly or through a wired connection. Since Session Initiation Protocol (SIP) is a predominant enabler-protocol for voice or video calls over the Internet, as well as for telephone calls over the PSTN, the intelligent agent 200 can be implemented as a SIP client device in many embodiments.

The chatbot 202 comprises a package of software 203 containing natural language processing and understanding (NLP/NLU), dialogue management (DM), speech-to-text (STT) conversion, and text-to-speech (TTS) conversion. In embodiments consistent with the present invention, these software modules can reside in the same (physical or virtual) server or be distributed over different servers in the Internet cloud. Furthermore, domain-specific chatbots, trained with domain-specific data for various applications, are also consistent with the present invention.

As shown in FIG. 2, the human-chatbot conversation between the chatbot 202 and the user 204 is transmitted over the Internet, and that between the chatbot 202 and the user 206 is transmitted over the PSTN. Over the Internet, the user 204 can use a smartphone or a tablet, laptop or desktop computer as the communication tool, and on the chatbot 202 side, a web-call server 208 is commonly used in conjunction with the intelligent agent 200 and the chatbot 202. Over the PSTN, the user 206 can use a smartphone or a traditional telephone as the communication tool, and on the chatbot 202 side, a PBX 210 and an ACD/CTI server 212 are usually used in conjunction with the intelligent agent 200 and the chatbot 202. The connection between the intelligent agent 200 and the web-call server 208 can be wireless or wired—so is the connection between the intelligent agent 200 and the ACD/CTI server 212.

In certain embodiments, the intelligent agent 200 is equipped with a microphone, a speaker, and a connection to a digital display 214, and hence it can serve as a user interface that enables the user 216 in the vicinity of the intelligent agent 200 to engage in an interactive three-way conversation with the chatbot 202 and the remote user 204 or 206. A video conference call involving a virtual assistant (a chatbot) represents such an application scenario.

In certain embodiments, the intelligent agent 200 is linked with one or more peripheral devices 218, or one or more sensors 220, either wirelessly or via wired connections. If the connection is wireless, the peripheral devices 218 and sensors 220 can be remote, and in some embodiments located right next to the remote users.

For example, a camera (an image sensor) equipped on a remote user's smartphone or computer can serve as a remote sensor. This enables the intelligent agent 200 to send controlling signals to control the peripheral devices 218 according to intents of the human-chatbot conversation, or to receive data or images from the sensors 220 as references for altering the course of the conversation.

Figure 3:
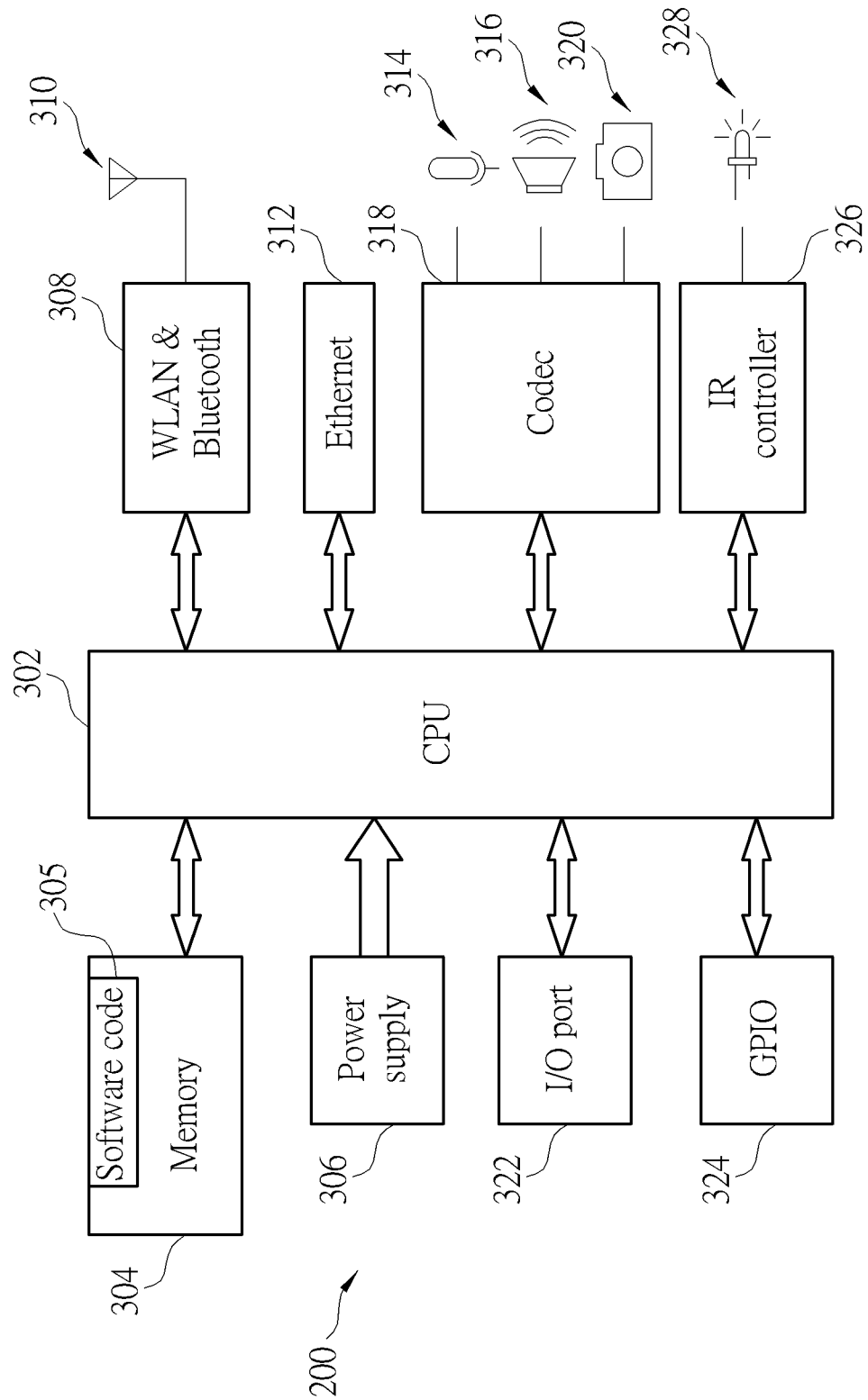
FIG. 3 is a block diagram illustrating key components of an intelligent agent device consistent with some embodiments of the present invention.

FIG. 3 is a block diagram illustrating key components of an intelligent agent 200 consistent with some embodiments of the present invention. A basic configuration comprises a central processing unit (CPU) 302, a memory module 304, a power supply module 306, and a wireless module 308 supporting WLAN (IEEE 802.11) and Bluetooth standards, along with its antenna 310. Optionally, the intelligent agent may also contain an Ethernet connection 312 for usages in wired local area networks.

For the local user 216 (depicted in FIG. 2) to engage in a three-way human-chatbot voice call, the intelligent agent 200 needs to be equipped with a microphone (or a microphone array) 314 and a speaker (or speakers) 316, along with a codec module 318 for encoding and decoding the audio signal streams. Furthermore, by adding to the intelligent agent 200 a camera module 320 with its corresponding video codec, and an I/O port 322 for connecting to a digital display 214, a three-way human-chatbot video call can be implemented.

In some embodiments, the intelligent agent 200 can be used to control certain peripheral devices 218 according to instructions given in the human-chatbot conversation. The controlling signals can either be sent through the wireless channel (WEAN or Bluetooth) 308 or a wired general-purpose-input-output (GPIO) connection 324.

Alternatively, controlling of some peripheral devices can be carried out with a programmable infrared controller module 326 and its corresponding infrared emitter and receiver 328. Furthermore, the intelligent agent 200 can receive data or images from certain sensors or cameras 220 (connected through the wireless channel 308 or the GPIO 324), or it can receive images from the built-in camera 320.

These data or images can serve as references for the intelligent agent 200 to alter the course of the human-chatbot conversation. The device-controlling, sensor-monitoring and image-capturing capabilities of the intelligent agent 200 can all be incorporated into the flow control of human-chatbot calls, resulting in sophisticated interactions between the two.

The memory module 304 contains an operating system that manages the hardware and software for the intelligent agent. It also stores application-specific software code 305 and certain run-time data. On the other hand, the human-chatbot conversational log data are usually stored and analyzed elsewhere in the Internet cloud.

There are a great number of ways for the intelligent agent 200 to facilitate and manage the human-chatbot communication. The utility and versatility of the intelligent agent 200 are illustrated with the following methods. However, these methods are usually not stand-alone methods—they are useful as components incorporated into more complex human-chatbot conversational flow controls. Those skilled in the art will readily recognize that these methods, along with their combinations and extensions, are applicable to a variety of scenarios, making human-chatbot conversations interactive as well as productive.

Figure 4:
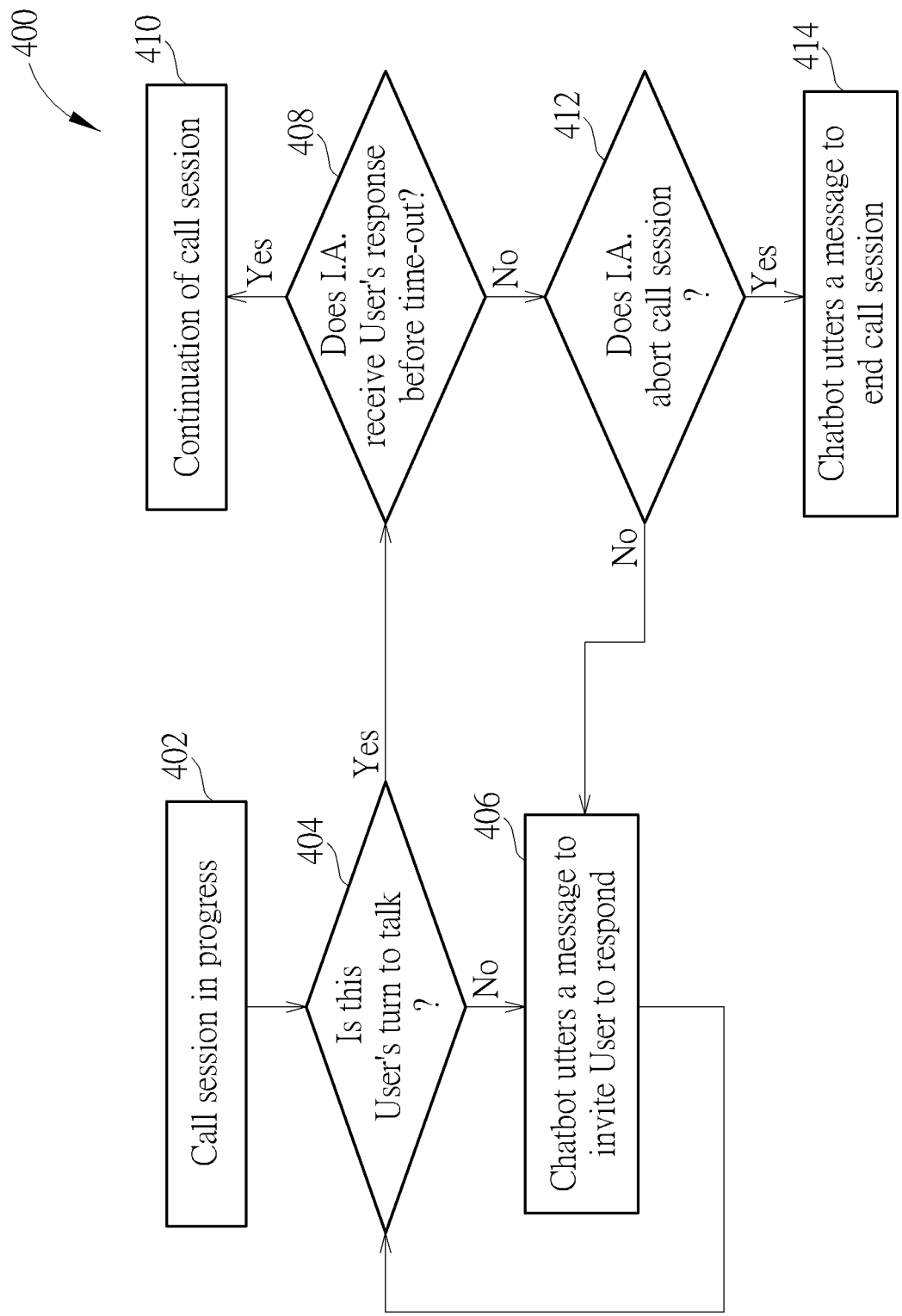
FIG. 4 is a flowchart of a time-out method for using an intelligent agent to improve the flow of human-chatbot conversations consistent with some embodiments of the present invention.

FIG. 4 is a flowchart 400 of a time-out method for using an intelligent agent 200 (herein referred to as I.A.) to improve the flow of human-chatbot conversations. During a human-chatbot conversation, it is natural for the human to pause from time to time (usually to think about what to say) when it is his/her turn to speak. This time-out method provides a mechanism to take care of such situations.

Referring to flowchart 400, operation 402 represents any moment during a human-chatbot call session when it is either the human user's or the chatbot's turn to talk. Operation 404 checks that if it is not the user's turn, the chatbot will talk (operation 406). Otherwise, the I.A. will wait for the user to talk (operation 408). If the user responds within a configurable time-out period, the call session will move on (operation 410). Otherwise, the I.A. could take one of the two options (operation 412): (1) if the call session is to continue, the I.A. will prompt the chatbot to say words inviting the user to respond (operation 406), or (2) the I.A. will prompt the chatbot to utter a message to end the call session (operation 414). The time-out cycle (operations 404, 408, 412, 406) can be repeated before the I.A. eventually chooses to terminate the call session in operation 414.

Figure 5:
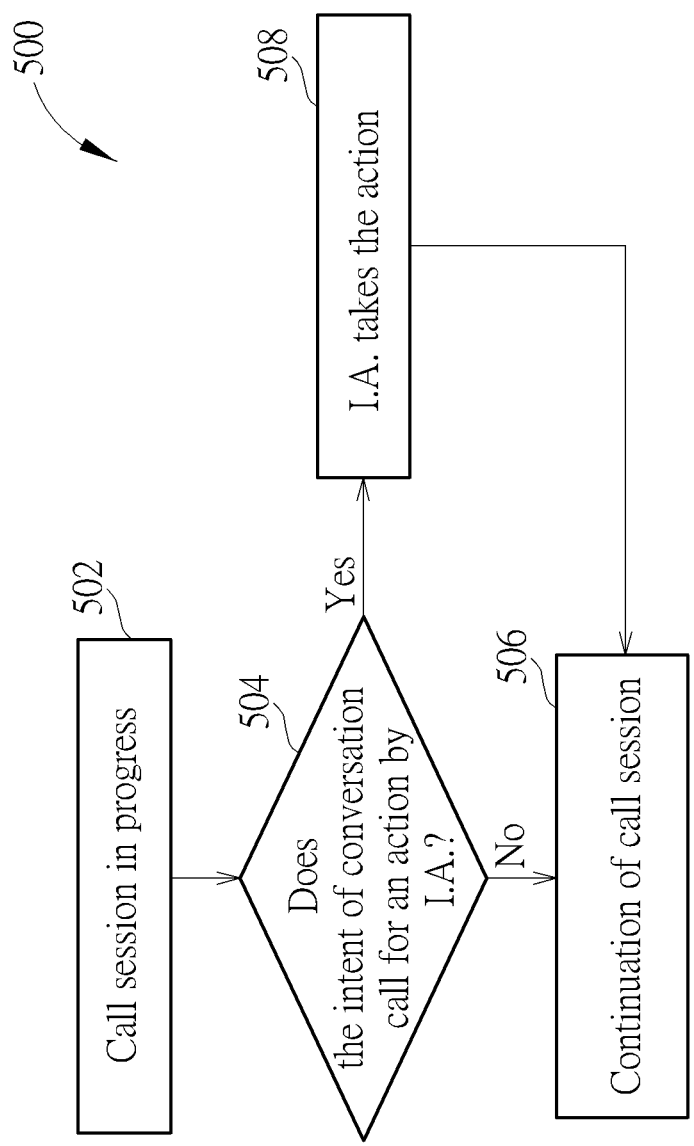
FIG. 5 is a flowchart of an action-taking method for using an intelligent agent to take actions according to intents of human-chatbot conversations consistent with some embodiments of the present invention.

FIG. 5 is a flowchart 500 of an action-taking method for using an intelligent agent to take actions according to intents of human-chatbot conversations. Herein an action can be any action accessible by the I.A. For example, the I.A. could send a device-controlling signal to control a particular peripheral device 218, or read current data from a sensor 220, or capture an image using its camera 320, or simply deliver a voice announcement over its speaker 316. It could also take any combination of actions—the possibilities are numerous.

Referring to flowchart 500, operation 502 represents any moment during a human-chatbot call session when the conversation expresses a certain intent. Operation 504 checks whether the intent calls for an action by I.A. If the intent does not require I.A. to act, the call session will move on (operation 506). Otherwise, the I.A. will take an action according to the intent (operation 508), and then the call session will resume after the action is completed (operation 506).

Figure 6:
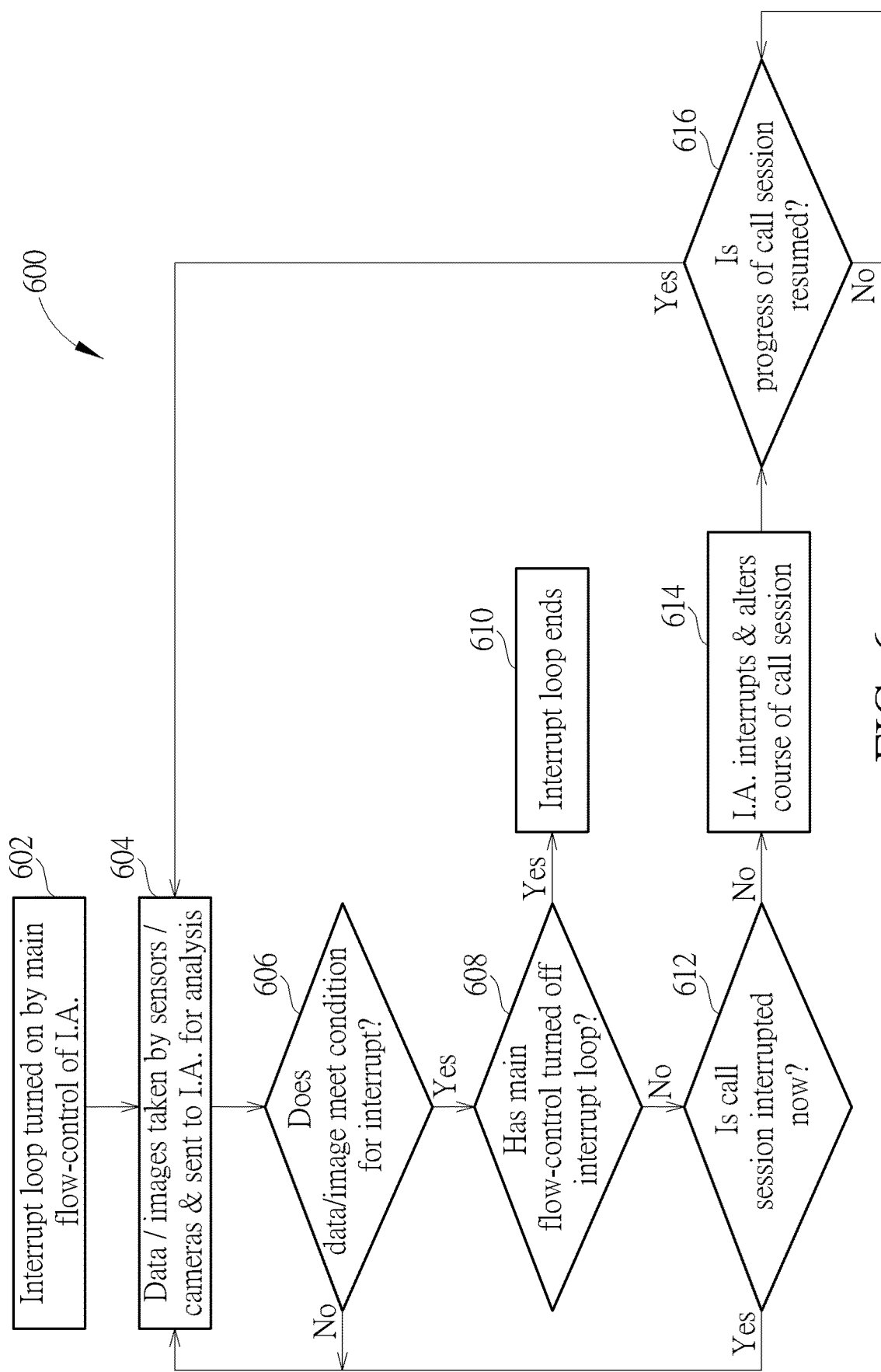
FIG. 6 is a flowchart of an interrupt method for using an intelligent agent to interrupt and alter the course of human-chatbot conversations according to certain conditions detected by sensors connected to the intelligent agent, consistent with some embodiments of the present invention.

FIG. 6 is a flowchart 600 of an interrupt method for using an intelligent agent 200 to interrupt and alter the course of human-chatbot conversations according to certain conditions detected by sensors or cameras linked to the intelligent agent 200. The effectiveness of a human-to-human conversation is partially due to the ability of humans to read voice tones, facial expressions and body language. However, a great majority of chatbots today lack such an ability. This is at least part of the reason why a human-chatbot conversation is significantly less effective. The intelligent agent of the present invention can be used to provide some solutions to this problem. For example, images of facial expressions and body language of a human user can be captured by an image sensor (camera) and analyzed with image-recognition software either built-in the intelligent agent 200 or cloud-based. If the analysis indicates certain alarming emotional condition (e.g. angry or sad) in the user, the direction of subsequent conversation will be altered accordingly.

Flowchart 600 represents an interrupt routine that can be turned on and off by a main program controlling the flow of a human-chatbot call session (herein referred to as "main flow-control"). Operation 602 represents a starting point when the interrupt loop is turned on. In operation 604, data or images are taken by pre-defined sensors or cameras and sent to the intelligent agent for analysis. Operation 606 checks whether the result of analysis meets the criteria for the intelligent agent to interrupt and alter the course of the call session. If not, operation 604 will be repeated. Otherwise, operation 608 will further check if the main flow-control has turned off the interrupt loop. If yes, the interrupt loop will end in operation 610. Otherwise, operation 612 will further check if the call session has already been interrupted. If it is true, no further interruption is necessary, and the loop flows back to operation 604. Otherwise, the intelligent agent will interrupt and alter the course of the call session in operation 614. In what follows, operation 616 will repetitively check if the call session has already moved on to a new course until it has happened. Then the interrupt loop starts over from operation 604.

The intelligent agent proposed herein not only monitors human-chatbot conversation but also coordinates and modifies the chatbot responses. The intelligent agent is a client device separated from its server, with the advantages of being customizable and scalable. That is, each intelligent-agent device can be programmed to service specific needs of its local network. Due to these features, a large number of distinct intelligent-agent devices can be used simultaneously with the same server without overloading it.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intelligent agent for human-chatbot communication, comprising:
a central processing unit, a memory module, a power supply module;
an operating system that manages the hardware and software of said intelligent agent;
wireless or wired connectivity to a chatbot software that simulates interactive human conversation with humans;
wireless or wired connectivity to human users over the Internet or the Public Switched Telephone Network;
software that enables and manages interactive voice or video calls between the chatbot and human users;
wireless or wired connectivity to one or more sensors; and
software for receiving and analyzing data or images taken with the one or more sensors, wherein said software provides an interrupt method usable during a voice or video call session between said chatbot and a human user, comprising:
said intelligent agent receiving and analyzing data or images from the connected sensor or sensors; and
said intelligent agent interrupting current flow of the call session and adjusting subsequent chatbot's responses if one or more pre-defined conditions are met.

2. The intelligent agent for human-chatbot communication of claim 1, wherein said connectivity to the Internet or the Public Switched Telephone Network supports Session Initiation Protocol (SIP) and said intelligent agent serves as a SIP client.

3. The intelligent agent for human-chatbot communication of claim 1, wherein said wireless connectivity supports WLAN (IEEE 802.11) and Bluetooth standards.

4. The intelligent agent for human-chatbot communication of claim 1, further comprising:
an infrared controller module and its corresponding infrared emitter and receiver; and
software for remotely controlling devices using the infrared controller.

5. The intelligent agent for human-chatbot communication of claim 1, further comprising:
wireless or wired connectivity to one or more peripheral devices; and
software for controlling these devices.

6. The intelligent agent for human-chatbot communication of claim 5, wherein said software provides an action-taking method usable during a voice or video call session between said chatbot and a human user, comprising:
said intelligent agent checking if the human-chatbot conversation expresses an intent to take an action, including any action to control the connected device or devices;
said intelligent agent taking the intended action if it is identified; and then
said intelligent agent directing the voice or video call session to continue.

7. The intelligent agent for human-chatbot communication of claim 1, further comprising:
a microphone or a microphone array;
a speaker or speakers;
a corresponding codec module for encoding and decoding audio signal streams; and
software that enables human users in the vicinity of said intelligent agent to engage in voice calls with the chatbot and remote human users.

8. The intelligent agent for human-chatbot communication of claim 7, further comprising:
wireless or wired connectivity to a digital display; and
software that enables human users in the vicinity of said intelligent agent to engage in video calls with the chatbot and remote human users.

9. An intelligent agent for human-chatbot communication, comprising:
a central processing unit, a memory module, a power supply module;
an operating system that manages the hardware and software of said intelligent agent;
wireless or wired connectivity to a chatbot software that simulates interactive human conversation with humans;

wireless or wired connectivity to human users over the Internet or the Public Switched Telephone Network; and software that enables and manages interactive voice or video calls between the chatbot and human users, wherein said software provides a time-out method usable during a voice or video call session between said chatbot and a human user, comprising:

said intelligent agent expecting and waiting for a response from the human user;

said intelligent agent directing the call session to continue if the user responds before a configurable time-out period; otherwise, said intelligent agent prompting the chatbot to utter a message inviting the user to respond;

said intelligent agent repeating the above three steps until the user responds; and said intelligent agent terminating the call session if the user does not respond after a configurable number of time-out periods.

10. The intelligent agent for human-chatbot communication of claim 9, wherein said connectivity to the Internet or the Public Switched Telephone Network supports Session Initiation Protocol (SIP) and said intelligent agent serves as a SIP client.

11. The intelligent agent for human-chatbot communication of claim 9, wherein said wireless connectivity supports WLAN (IEEE 802.11) and Bluetooth standards.

12. The intelligent agent for human-chatbot communication of claim 9, further comprising:

an infrared controller module and its corresponding infrared emitter and receiver; and software for remotely controlling devices using the infrared controller.

13. The intelligent agent for human-chatbot communication of claim 9, further comprising:

wireless or wired connectivity to one or more peripheral devices; and software for controlling these devices.

14. The intelligent agent for human-chatbot communication of claim 13, wherein said software provides an action-taking method usable during a voice or video call session between said chatbot and a human user, comprising:

said intelligent agent checking if the human-chatbot conversation expresses an intent to take an action, including any action to control the connected device or devices;

said intelligent agent taking the intended action if it is identified; and then said intelligent agent directing the voice or video call session to continue.

15. The intelligent agent for human-chatbot communication of claim 9, further comprising:

wireless or wired connectivity to one or more sensors; and software for receiving and analyzing data or images taken with these sensors.

16. The intelligent agent for human-chatbot communication of claim 15, wherein said software provides an interrupt method usable during a voice or video call session between said chatbot and a human user, comprising:

said intelligent agent receiving and analyzing data or images from the connected sensor or sensors; and said intelligent agent interrupting current flow of the call session and adjusting subsequent chatbot's responses if one or more pre-defined conditions are met.

17. The intelligent agent for human-chatbot communication of claim 9, further comprising:

a microphone or a microphone array;

a speaker or speakers;

a corresponding codec module for encoding and decoding audio signal streams; and software that enables human users in the vicinity of said intelligent agent to engage in voice calls with the chatbot and remote human users.

18. The intelligent agent for human-chatbot communication of claim 17, further comprising:

wireless or wired connectivity to a digital display; and software that enables human users in the vicinity of said intelligent agent to engage in video calls with the chatbot and remote human users.

\* \* \* \* \*